United States Patent
Baccioli et al.

(10) Patent No.: US 6,869,247 B2
(45) Date of Patent: Mar. 22, 2005

(54) TUBE PLATE FOR TUBE BUNDLES FOR CHEMICAL REACTORS AND HEAT EXCHANGERS IN GENERAL

(75) Inventors: Giuseppe Baccioli, Massa (IT); Lorenzo Barbieri, Avenza (IT); Andrea Ronchieri, Massa (IT); Lorenzo Pierucci, Massa (IT); Silvano Bertolini, Marina Di Massa (IT)

(73) Assignee: Nuovo Pignone Holding S.p.A., Florence (IT)

( * ) Notice: Subject to any disclaimer, the term of this patent is extended or adjusted under 35 U.S.C. 154(b) by 0 days.

(21) Appl. No.: 09/989,132

(22) Filed: Nov. 21, 2001

(65) Prior Publication Data

US 2002/0062952 A1 May 30, 2002

(30) Foreign Application Priority Data

Nov. 30, 2000 (IT) .................................... MI2000A2594

(51) Int. Cl.$^7$ .......................... B66F 3/24; B23P 19/027
(52) U.S. Cl. .................................... 403/364; 403/403.1
(58) Field of Search .............................. 463/463.1, 265, 463/266, 267, 268, 270, 271, 272, 354, 353, 345, 364

(56) References Cited

U.S. PATENT DOCUMENTS

| | | | |
|---|---|---|---|
| 2,858,582 A | * 11/1958 | Toulmin, Jr. ............. 403/364 X |
| 4,134,451 A | 1/1979 | Conant et al. |
| 4,206,802 A | 6/1980 | Reed et al. |
| 4,223,722 A | 9/1980 | Shade, Jr. |
| 4,246,872 A | 1/1981 | Skinner et al. |
| 4,373,829 A | * 2/1983 | Braxell ....................... 403/267 |
| 5,048,601 A | 9/1991 | Yamaguchi et al. |
| 5,472,928 A | 12/1995 | Scheuerman et al. |
| 5,709,500 A | * 1/1998 | Mizelle et al. .............. 403/364 |
| 5,972,524 A | * 10/1999 | Childress ................ 403/271 X |
| 6,530,713 B2 | * 3/2003 | Ezumi et al. ............... 403/270 |
| 6,530,719 B1 | * 3/2003 | Stephan ...................... 403/364 |

FOREIGN PATENT DOCUMENTS

| | | |
|---|---|---|
| DE | 195 01 276 A1 | 1/1995 |
| DE | 19501276 | 7/1996 |
| EP | 0383224 | 8/1990 |
| FR | 2 645 941 | 10/1990 |
| FR | 2645941 | 10/1990 |

\* cited by examiner

*Primary Examiner*—John R. Cottingham
(74) *Attorney, Agent, or Firm*—Nixon & Vanderhye P.C.

(57) ABSTRACT

A tube plate for tube bundles for chemical reactors and heat exchangers in general, includes a plurality of components, with shapes that are complementary to one another, in order to form a complete plate. The components may be produced separately, and are connected to one another subsequently by means of mechanical joints, in order to form the tube plate. The components which form the tube plate are joined to one another by of a plurality of pins, or other mechanical connections, which are inserted in corresponding holes provided in the respective components. This joint can be completed by means of welded connections on the mechanical connection parts.

15 Claims, 1 Drawing Sheet

TUBE PLATE FOR TUBE BUNDLES FOR CHEMICAL REACTORS AND HEAT EXCHANGERS IN GENERAL

BACKGROUND OF THE INVENTION

The present invention relates to a tube plate for tube bundles for chemical reactors and heat exchangers in general.

The present invention can also be applied to petrochemical and refinery reactors.

As is known, chemical reactors consist of containers with large dimensions, inside which chemical reactions take place at a high temperature and a high pressure.

Inside their substantially cylindrical body, these chemical reactors generally have a plurality of tubes, or tube bundles, which can carry out various functions, including assisting heat exchange between the operating fluids.

These tube bundles are installed and kept in an operative position by means of use of tube plates, which in some cases can have large dimensions.

With particular reference to the state of the art, it can be noted that, at present, the tube plates are produced in a single piece, or alternatively in several pieces which are welded together and then finished, for example which are drilled and/or machined.

However, these processing operations cause some significant technical problems which must be faced satisfactorily.

Firstly, in order to carry out these processing operations, particular machine tools are necessary, which have large capacities, large useful dimensions, and high costs.

In addition, the operations to be carried out for these purposes are such that they require processing times which are often too lengthy for present requirements.

Other problems according to the known art are caused by deformations which are created in the tube plate, as a result of welding shrinkages, in particular in the case of joints which are fully welded.

SUMMARY OF THE INVENTION

This invention provides a tube plate for tube bundles for chemical reactors, which eliminates the above-described disadvantages. The tube plate can be produced quickly and economically and is safe and reliable when it is installed.

In one aspect, the present invention relates to a tube plate adapted to hold a bundle of tubes, the tube plate comprising a first perforated component having a first facing edge thereof; a second perforated component having a second facing edge thereof, the facing edges having mating complementary surfaces that enable the first and second perforated components to be joined so as to form a smooth interface therebetween; and a plurality of pin fasteners extending through the complementary surfaces of the first and second perforated components to thereby form a connection between the first and second perforated components.

In another aspect, the invention relates to a tube plate for holding a plurality of tubes, the tube plate comprising first and second semi-circular components joined together mechanically along a smooth interface defined by a pair of facing straight edges, respectively, of the first and second semi-circular components, each of the semi-circular components having a plurality of perforations for receiving individual ones of the tubes.

In still another aspect, the invention relates to a tube plate for holding a plurality of tubes, the tube plate comprising first and second semi-circular components joined together mechanically along a pair of facing straight edges, respectively, of the first and second semi-circular components, each of the semi-circular components having a plurality of perforations for receiving individual ones of the tubes; the first semi-circular component provided with a projection along one of the pair of facing straight edges and the second semi-circular component provided with a cavity along the other of said pair of facing straight edges, the projection received within the cavity so as to form a smooth connecting interface between the first and second semi-circular components.

Further characteristics of the tube plate for tube bundles for chemical reactors, according to the present invention, are defined in the other claims attached to the present application.

The characteristics and advantages of the tube plate for tube bundles for chemical reactors, according to the present invention, will become more apparent from the following description of a typical embodiment, provided by way of non-limited example, with reference to the attached schematic drawings described below.

DETAILED DESCRIPTION OF THE DRAWINGS

Figure 1:
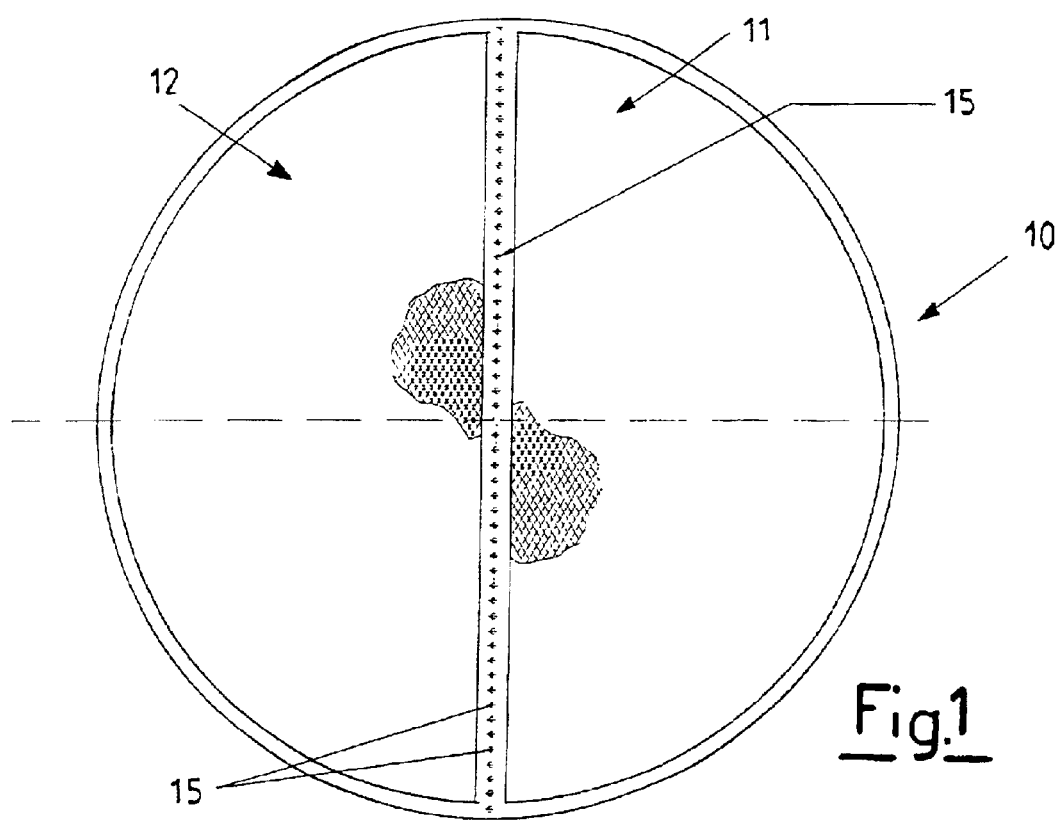
FIG. 1 represents in plan view a tube plate for tube bundles for chemical reactors, according to the present invention.
Figure 2:
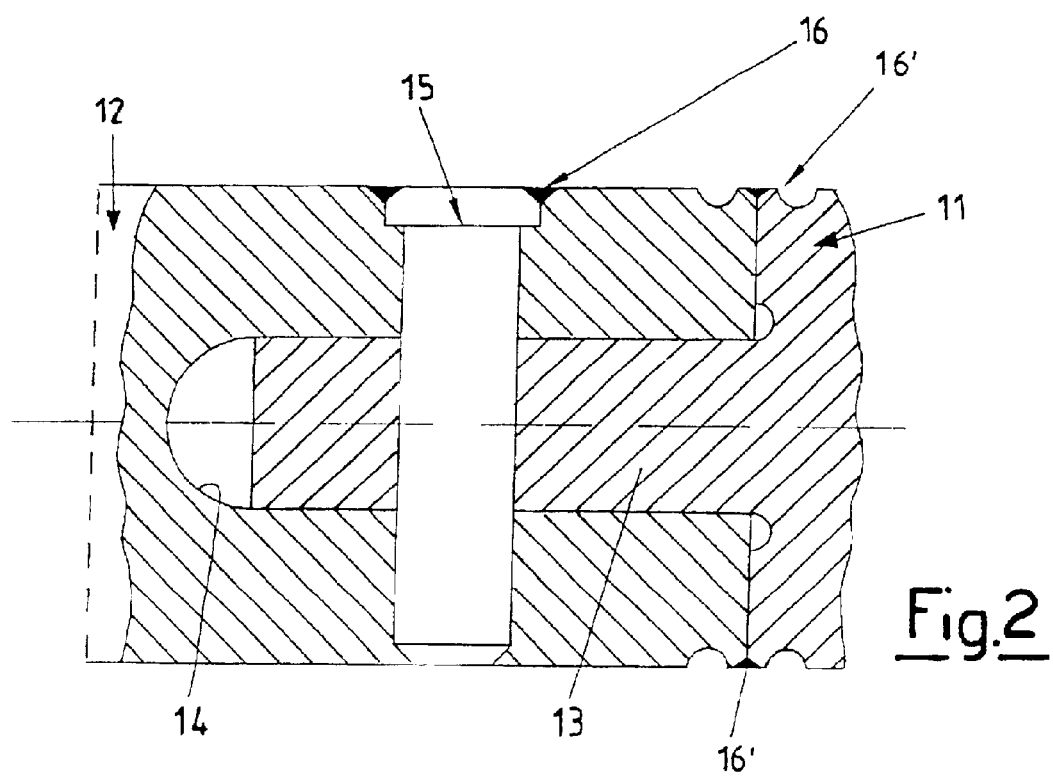
FIG. 2 represents, partially in cross-section, a detail of the system for connection between components of the tube plate in the preceding figure, according to a preferred embodiment of the present invention.

With particular reference to FIGS. 1 and 2, the tube plate for tube bundles with large sizes, according to the present invention, is indicated globally by the reference number 10.

In the exemplary embodiment illustrated, the tube plate 10 has two components, 11 and 12, with a substantially semi-circular shape, which have previously been machined.

It will be appreciated that, according to the present invention, perforated plates can be produced in several pieces or components, according to requirements and to the design dimensions, which are subsequently joined together by means of mechanical joints.

Thus, a perforated plate with large dimensions is produced in several parts which are connected to one another.

As described briefly hereinafter, the components of the tube plate, the number of which depends on the dimensions and the structural requirements, are processed until they are completed, and are then connected mechanically. In the example illustrated, the semi-circular components 11 and 12 are joined to one another by means of a plurality of pins 15.

The pins 15 are inserted in holes provided respectively in the component 12 and in a projecting portion 13 of the component 11.

In fact, the component 11 has a projection 13 which is inserted in a corresponding cavity 14 in the component 12 to thereby form a smooth connecting interface between the components as seen in FIG. 2.

The connection of these components 11 and 12 is completed by means of welded connections 16, between the head of the pin 15 and the component 12, and by means of further welded connections 16' between the components 11 and 12.

However, in addition to the example described, in order to guarantee sealing, seals of any type can be used, or, alternatively, a welding seal can be produced on the mechanical connection parts (which can consist of braces, screws, wedges, cams etc.).

As a result, the invention makes it possible to process separately and in parallel components with smaller dimensions, on machines with smaller dimensions and capacities.

The description provided makes apparent the characteristics and technical advantages of the tube plate for tube bundles for chemical reactors, according to the present invention.

The following considerations and concluding comments are now made, in order to define the said advantages more clearly and accurately.

The invention avoids the need to use machine tools with large capacities and large useful dimensions, and the time for construction of the manufactured product is reduced.

In addition, there is a drastic reduction in the problems of deformation caused by welding shrinkages, in the case of fully welded joints.

The invention can be applied to chemical reactors, heat exchangers, and in general to tube-bundle type pressure devices.

Finally, it is apparent that many other variations can be made to the tube plate or tube bundles for chemical reactors which is the subject of the present invention, without departing from the principles of novelty which are inherent in the inventive concept.

It is also apparent that, in the practical implementation of the invention, any materials, dimensions and forms can be used according to requirements, and can be replaced by others which are technically equivalent.

In fact, the same results could be obtained with different connection technologies, provided that the novelty of the inventive concepts contained in the present description is applied.

The scope of the present invention is defined by the attached claims.

What is claimed is:

1. A tube plate in a chemical reactor or heat exchanger, adapted to hold a bundle of tubes, said tube plate comprising:
    a first plate component perforated to receive a first plurality of tubes of the bundle and having a first facing edge thereof;
    a second plate component perforated to receive a second plurality of tubes of the bundle and having a second facing edge thereof, said facing edges having mating complementary surfaces that enable said first and second perforated components to be joined so as to form a smooth interface therebetween; and
    a plurality of pin fasteners extending through said complementary surfaces of said first and second perforated components to thereby form a connection between said first and second perforated components.

2. A tube plate holding a bundle of tubes in a chemical reactor or heat exchanger, said tube plate comprising:
    a first perforated component having a first facing edge thereof;
    a second perforated component having a second facing edge thereof, said facing edges having mating complementary surfaces that enable said first and second perforated components to be joined so as to form a smooth interface therebetween; and
    a plurality of pin fasteners extending through said complementary surfaces of said first and second perforated components to thereby form a connection between said first and second perforated components;
    wherein the connection of said first and second perforated components includes welds between heads of pin fasteners and at least one of said first and second perforated components.

3. The tube plate according to claim 1 wherein said first and second perforated components are each semi-circular in shape and joined to one another along a median line defined by said first and second facing edges.

4. A tube plate holding a bundle of tubes in a chemical reactor or heat exchanger, said tube plate comprising:
    a first perforated component having a first facing edge thereof;
    a second perforated component having a second facing edge thereof, said facing edges having mating complementary surfaces that enable said first and second perforated components to be joined so as to form a smooth interface therebetween; and
    a plurality of pin fasteners extending through said complementary surfaces of said first and second perforated components to thereby form a connection between said first and second perforated components;
    wherein said first and second perforated components are welded along said first and second facing edges.

5. The tube plate of claim 3 wherein said first and second perforated components are welded along said first and second facing edges.

6. The tube plate of claim 1 wherein said complementary surfaces include a projection along said first facing edge and a cavity along said second facing edge.

7. A tube plate in a chemical reactor or heat exchanger, adapted to receive a plurality of tubes, said tube plate comprising first and second semi-circular plate components joined together mechanically along a smooth interface defined by a pair of facing straight edges, respectively, of said first and second semi-circular components, each of said semi-circular components having a plurality of perforations for receiving individual ones of said tubes.

8. A tube plate holding a plurality of tubes in a chemical reactor or heat exchanger, said tube plate comprising first and second semi-circular components joined together mechanically along a smooth interface defined by a pair of facing straight edges, respectively, of said first and second semi-circular components, each of said semi-circular components having a plurality of perforations for receiving individual ones of said tubes;
    wherein said first and second semi-circular components are joined along said pair of facing straight edges by welding.

9. The tube plate of claim 7 wherein said first and second semi-circular components are joined along said pair of facing straight edges by a plurality of pins.

10. The tube plate of claim 9 wherein said pins are welded to one of said first and second semi-circular components.

11. The tube plate of claim 8 wherein said first and second semi-circular components are joined along said pair of facing straight edges by a plurality of pins.

12. The tube plate of claim 11 wherein said pins are welded to one of said first and second semi-circular components.

13. A tube plate holding a plurality of tubes in a chemical reactor or heat exchanger, said tube plate comprising first and second semi-circular plate components joined together mechanically along a pair of facing straight edges, respectively, of said first and second semi-circular components, each of said semi-circular components having a plurality of perforations for receiving individual ones of said tubes; said first semi-circular component provided with a projection along one of said pair of facing straight edges and said second semi-circular component provided with a cavity along the other of said pair of facing straight edges, said projection received within said cavity so as to form a smooth connecting interface between said first and second semi-circular components.

14. A tube plate holding a plurality of tubes in a chemical reactor or heat exchanger, said tube plate comprising first and second semi-circular components joined together mechanically along a pair of facing straight edges, respectively, of said first and second semi-circular components, each of said semi-circular components having a plurality of perforations for receiving individual ones of said tubes; said first semi-circular component provided with a projection along one of said pair of facing straight edges and said second semi-circular component provided with a cavity along the other of said pair of facing straight edges, said projection received within said cavity so as to form a smooth connecting interface between said first and second semi-circular components; and wherein a plurality of pins extend through said first and second semi-circular components including said projection, along said pair of facing straight edges; and further wherein said smooth connecting interface includes welds between heads of said plurality of pins and at least one of said first and second perforated components.

15. The tube plate of claim 14 wherein said first and second semi-circular components are joined along said pair of facing straight edges by welding.

* * * * *